(12) United States Patent
Skurdalsvold et al.

(10) Patent No.: US 6,378,460 B1
(45) Date of Patent: Apr. 30, 2002

(54) NESTABLE PET FOOD DISPENSERS

(75) Inventors: Scott A. Skurdalsvold, Arlington; Ralph VanSkiver, Manchester, both of TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 09/874,590

(22) Filed: Jun. 5, 2001

(51) Int. Cl.⁷ .................................................. A01K 5/01
(52) U.S. Cl. ........................................ 119/61; 119/51.5
(58) Field of Search ............................ 119/51.5, 62, 61, 119/74, 75, 52.1, 51.03; D30/121, 122, 129, 130, 131, 132, 133

(56) References Cited

U.S. PATENT DOCUMENTS

| | | | |
|---|---|---|---|
| 4,721,063 A | * | 1/1988 | Atchley ........................ 119/52 |
| D330,098 S | | 10/1992 | VanSkiver |
| 5,259,336 A | | 11/1993 | Clark |
| D350,841 S | | 9/1994 | VanSkiver |
| D350,842 S | | 9/1994 | VanSkiver |
| D351,689 S | | 10/1994 | VanSkiver |
| 5,467,735 A | | 11/1995 | Chrisco |
| D364,942 S | | 12/1995 | VanSkiver et al. |
| D374,109 S | * | 9/1996 | Lihelund et al. ............ D30/121 |
| 5,752,464 A | * | 5/1998 | King et al. .................... 119/63 |
| D402,428 S | | 12/1998 | Chrisco |
| D405,560 S | | 2/1999 | Chrisco |
| D406,924 S | | 3/1999 | Kolozsvari |
| D406,926 S | | 3/1999 | Kolozsvari |
| 6,296,626 B1 | * | 10/2001 | Stein .......................... 604/294 |

OTHER PUBLICATIONS

Photographs. Pet Feeder/Waterer (Pet Mate); Doskocil Mfg. Co., Inc. (3 sheets); date unknown.
Photographs. Pet Feeder/Waterer (Gourmet); Blitz USA, Inc. (3 sheets); date unknown.
Photographs. Photographs. Pet Feeder/Waterer (Auto); Van Ness (3 sheets); date unknown.

* cited by examiner

Primary Examiner—Robert P. Swiatek
Assistant Examiner—Danielle Rosenthal
(74) Attorney, Agent, or Firm—Locke Liddell & Sapp LLP

(57) ABSTRACT

A pet food dispenser selectively nestable to a similarly configured dispenser for locking a pair of dispensers together for shipping and display purposes. The dispenser includes a reservoir for storing food. A cap is provided for the reservoir. A base is connected to the reservoir which includes a bowl for receiving food from the reservoir. The cap includes an extension for nestably mating with the bowl of another dispenser.

2 Claims, 1 Drawing Sheet

NESTABLE PET FOOD DISPENSERS

TECHNICAL FIELD OF THE INVENTION

The present invention relates to dispensers for pet food and water, and more particularly to a dispenser having cooperatively sized parts that are nestable for selectively locking a pair of dispensers together.

BACKGROUND OF THE INVENTION

While pet food dispensers for dispensing food as well as water to a pet may be economical to manufacture, shipping costs represent a significant element of the overall product cost to a retailer. Such dispensers have unique shapes requiring special packaging which may add to the overall volume and space required for displaying the dispenser on a retailer's shelf.

It is therefore desirable to economically package pet food dispensers for shipping as well as display purposes.

SUMMARY OF THE INVENTION

In accordance with the present invention, a pet food dispenser is provided that is selectively nestable to a similarly configured dispenser for selectively locking a pair of dispensers together for shipping and display purposes. The dispenser includes a reservoir for storing food. A cap is provided for the reservoir. A base is connected to the reservoir which includes a bowl for receiving food from the reservoir. The cap includes an extension for nestably mating with the bowl of another dispenser.

BRIEF DESCRIPTION OF THE DRAWINGS

For a more complete understanding of the present invention and for further advantages thereof, reference is now made to the following description of the preferred embodiments taken in conjunction with accompanying drawings in which.

DESCRIPTION OF THE PREFERRED EMBODIMENTS

Figure 1:
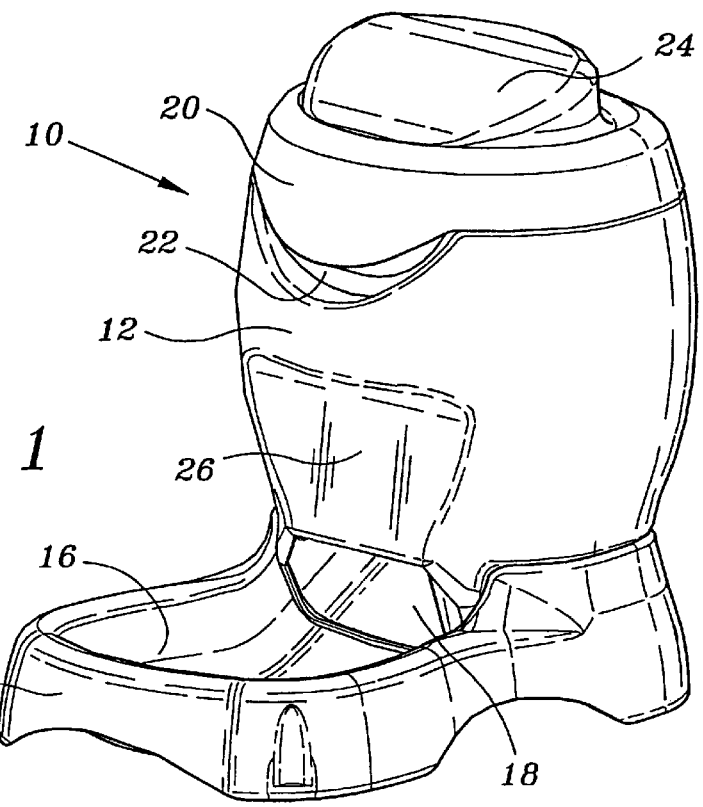
FIG. 1 is a perspective view of the present pet food dispenser.

Referring to FIG. 1, a pet food dispenser in accordance with the present invention is illustrated, and is generally identified by the numeral 10. Dispenser 10 is utilized for dispensing food, so that such food can be easily accessible to a pet. As used herein, the term food includes food of a solid type as well as water. Dispenser 10 can be adapted for holding a bottle containing water which can also be selectively dispensed for access by a pet.

Dispenser 10 includes a reservoir 12 for storing food. A base 14 is interconnected to reservoir 12. Base 14 includes a bowl 16 which receives food from reservoir 12 via an opening 18. As food is consumed by a pet from bowl 16, food is gravity fed from reservoir 12 through opening 18 to replenish the supply of food in bowl 16.

Food is inserted into reservoir 12 through an opening in the top of reservoir 12 covered by a cap 20. Cap 20 is removable from reservoir 12 by grasping cap 20 and inserting a finger or other object in gap 22.

Cap 20 includes an upwardly extending projection 24. Reservoir 12 includes recess 26. Projection 24 and recess 26 are utilized for nestably mating a pair of dispensers 10 as will subsequently be described with respect to FIG. 2.

Figure 2:
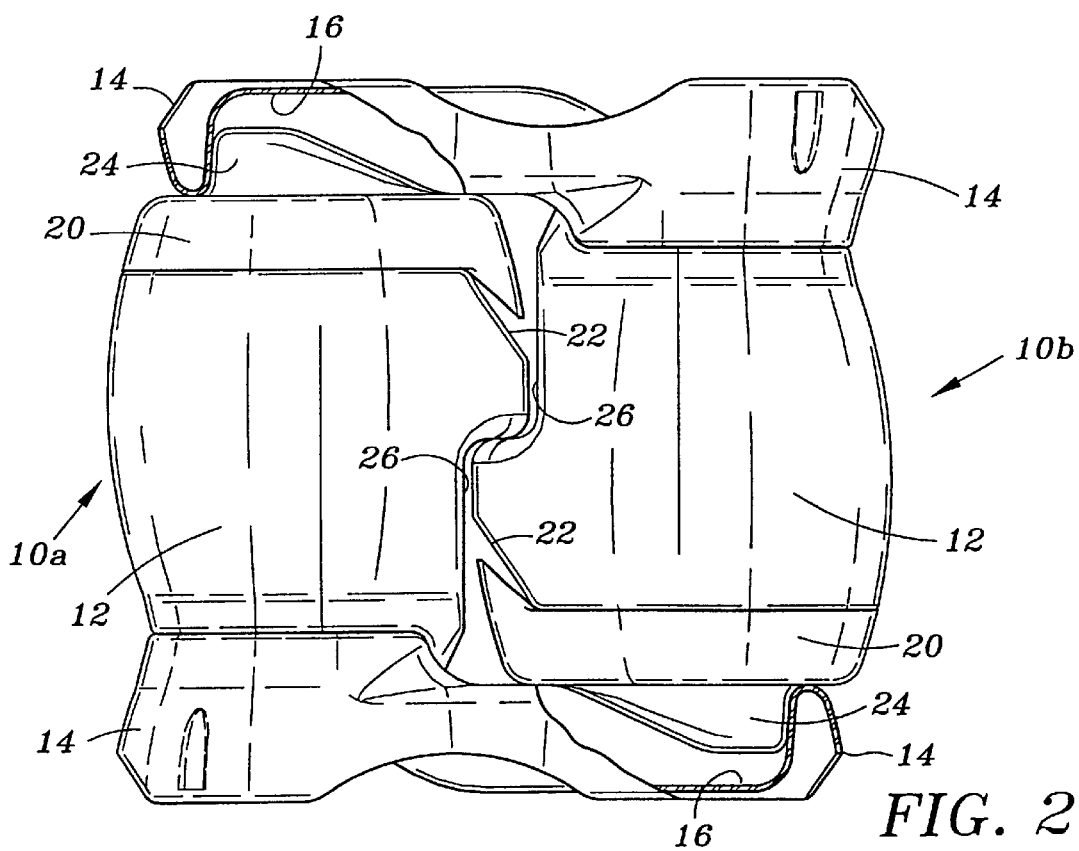
FIG. 2 is a side elevational view of a pair of dispensers shown in FIG. 1 in the nested and locked position.

Referring now to FIG. 2, an important aspect of the present invention is the capability of a pair of dispensers 10 to nest and selectively lock together for purposes of shipping and display on a retailer's shelf. FIG. 2 illustrates a pair of dispensers 10a and 10b. Each dispenser 10a and 10b is identical, and like and corresponding components are identified by the same reference numerals. Dispenser 10b is inverted with respect to the position of dispenser 10a. Projection 24 of cap 20 of dispenser 10a is positioned within bowl 16 of dispenser 10b. Similarly, projection 24 of cap 20 of dispenser 10b is positioned within bowl 16 of dispenser 10a. The interaction between projections 24 and bowls 16 form an interlock relationship between dispensers 10a and 10b. Dispensers 10a and 10b are also interconnected via the mating recesses 26. A portion of reservoir 12 of dispenser 10a is received within recess 26 of reservoir 12 of dispenser 10b. Similarly, a portion of reservoir 12 of dispenser 10b is received within the recess 26 of reservoir 10a. The interconnection between reservoirs 12 further function to lock dispenser 10a and 10b together.

It therefore can be seen that the present invention provides for an efficient manner to selectively lock a pair of pet food dispensers together for shipping and display purposes. No additional components or assembly steps are necessary in order to selectively lock the dispensers together, and the dispensers are ready for use after separation.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A pair of pet food dispensers comprising:

a first dispenser including a reservoir for storing food, a cap for said reservoir, a base connected to said reservoir, said base including a bowl for receiving food from said reservoir;

a second dispenser including a reservoir for storing food, a cap for said reservoir, a base connected to said reservoir, said base including a bowl for receiving food from said reservoir;

said cap of said first dispenser including an extension for nestably mating with said bowl of said second dispenser when said second dispenser is in an inverted position with respect to said first dispenser; and said cap of said second dispenser including an extension for nestably mating with said bowl of said first dispenser when said second dispenser is in inverted position with respect to said first dispenser, such that said cap extensions and said bowls of said first and second dispensers form a lock for selectively joining said first and second dispensers.

2. The pair of pet dispensers of claim 1 wherein said first and second reservoirs each include a recess, such that said first dispenser reservoir mates with said recess of said second dispenser reservoir and said second dispenser reservoir mates with said recess of said first dispenser reservoir when said second dispenser is in an inverted position with respect to said first dispenser.

* * * * *